3,443,935
BORON-CARBON-SILICON ALLOY AND METHOD OF PRODUCING THE SAME

Alfred Lipp, Heising, Bavaria, Germany, assignor to Elektroschmelzwerk Kempten G.m.b.H., Munich, Bavaria, Germany, a corporation of Germany
No Drawing. Filed Apr. 19, 1965, Ser. No. 449,306
Claims priority, application Germany, Apr. 30, 1964, E 26,952
Int. Cl. C22c 29/00
U.S. Cl. 75—134                     8 Claims

ABSTRACT OF THE DISCLOSURE

A very hard, highly refractory alloy of rhombohedral boron carbide crystalline structure consisting essentially of 78–85% by weight of boron, 9–14% by weight of carbon and 6–13% by weight of silicon, produced by heating to temperatures of at least 1000° C. a mixture of 8–16% by weight of sand, 65–75% by weight of boric acid, and 15–25% by weight of carbon.

---

The present invention relates to a new carbon-boron-silicon alloy. More particularly, it relates to a new boron-carbon-silicon alloy of rhombohedric boron carbide structure containing 78–85% by weight of boron, 9–14% by weight of carbon and 6–13% by weight of silicon, and to a process of producing the same.

The boron-carbon-silicon alloys of the present invention are very hard and highly refractory and combine the extraordinary hardness of boron carbide with the good oxidation resistance of silicon carbide. They are, therefore, useful as neutron absorbers, as abrasives and as refractories. They are also suitable for use in the production of protective coatings and in the formation of deposits by means of plasma burners, as well as for other uses.

The alloys of the present invention can be produced by melting a suitable mixture of boric acid, carbon and sand in an electric resistance furnace, or more preferably, in an electric arc furnace, suitable proportions of such a reaction mixture being 65–75% by weight of boric acid, 15–25% by weight of carbon and 8–16% by weight of sand. When carrying out such an operation in an electric arc furnace it is generally advantageous to use voltages ranging from 60 to 160. In such an operation it has been noted that the current generally does not exceed 500 amperes. It cannot, therefore, be stated with certainty that the operation is merely that of a carbon arc furnace, since it appears that the operation functions at least partially in the manner of a resistance furnace.

In producing the new alloys of the present invention in the manner described above it has been found that the operation proceeds most advantageously when the ingredients of the reaction mixture are as finely divided as possible. This has been found to be especially the case when the carbon is in particle sizes of less than one micron.

While not essential, a preferred method of operation comprises first mixing the ingredients in the desired proportions and then molding the resulting mixture into particles of definite size. In such form the boric acid then serves as the required binder.

In preparing the reaction mixture it has been found that for the highest possible yields the reaction mixture should be proportioned so that the resulting reaction product will contain an excess of pure silicon. Accordingly, it is desirable to include in the reaction mixture more silicon than will be included in the alloy produced during the operation of the process.

Instead of using the ingredients of the alloy in the oxide form, use can also be made of the ingredients in their reduced form, as for example, metallic silicon instead of sand, and instead of boric acid and carbon, boron carbide can be employed. When the ingredients are used in their reduced form, however, it is advantageous to carry out the operation at temperatures of at least 1000° C., and preferably at temperatures of 1400–1500° C.

It has been unexpectedly discovered that the voltages used in the electric furnace can be varied through a fairly wide range without materially affecting the successful operation of the process.

The following specific examples are given for the purpose of illustrating the method of producing the new boron-carbon-silicon alloy of the present invention. It will be understood, however, that the specific procedures set forth therein can be varied in manners obvious to one skilled in the art without materially affecting the properties of the desired new alloy. Such procedures that do not depart from the basic concept disclosed herein, therefore, are intended to come within the scope of the appended claims.

EXAMPLE I

A mixture consisting of 15 kg. of $SiO_2$, 93 kg. of $H_3BO_3$ and 28 kg. of carbon having the greatest surface area possible was melted in an electric arc furnace formed of carbon blocks measuring not more than 50 x 35 x 50 cm. The initial voltage was 60 and gradually increased to 160. The current strength varied between 300 and 500 amperes. At the end of 4 hours the heating was discontinued, the electrodes withdrawn, and the furnace permitted to cool. The resulting reaction product consisted of unreacted material and 7 kg. of a compact fused product which after treatment with a hot hydrofluoric-nitric-sulfuric acid mixture was found to have a composition of approximately 82% by weight of boron, 12% by weight of carbon and 6% by weight of silicon.

The silicon present in the above alloy was found not to be combined with the carbon as silicon carbide. This was shown not only by the absence of the characteristic lines, of silicon carbide under X-ray analysis, but also by the picnometric density of 2.51 g./cm.$^3$, which corresponds to the density of boron carbide. If the silicon content of the alloy has been bonded to the carbon as silicon carbide, the density would have been 3.21 g./cm.$^3$ and the specific gravity would have been higher.

The structure was quite similar to that of rhombohedral boron carbide whose elementary cell, according to X-ray analysis, is widened. The grating constants according to the hexagonal system would measure $a_0 = 5.65$ Angstroms and $c_0 = 12.35$ Angstroms as against 5.60 Angstroms and 12.10 Angstroms for boron carbide. Corresponding to this lattice widening, the Knoop microhardness which is 2.800 kg./mm.$^2$ for boron carbide, drops to 2.500 kg./mm.$^2$ under a load of 100 g.

EXAMPLE II

A finely ground mixture of boron carbide and silicon in the weight ratio of 1:1 was compressed into particles of desired size, and heated for two hours to 1450° C. in a tubular furnace under an atmosphere of argon. The resulting product was then ground to 100 micron and smaller particle size, and thoroughly washed with a mixture of hydrofluoric-nitric-sulfuric acid. From the X-ray diagram of the residue thus obtained the lattice constants under the hexagonal system were calculated as $a_0 = 5.62$ Angstroms and $c_0 = 12.34$ Angstroms. As in Example I, the alloy was found to have a widened boron lattice.

The invention claimed is:

1. A very hard, highly refractory alloy of rhombohedral boron carbide structure consisting essentially of 78–85% by weight of boron, 9–14% by weight of carbon and 6–13% by weight of silicon.

2. A process for producing a highly refractory alloy of rhombohedral boron carbide structure which comprises heating to temperatures of at least 1000° C. a mixture of 8–16% by weight of sand, 65–75% by weight of boric acid, and 15–25% by weight of carbon.

3. The process of claim 2 wherein the reaction mixture is heated in an electric arc furnace.

4. The process of claim 2 wherein the reaction mixture is heated in an electric resistance furnace.

5. The process of claim 2 wherein the reaction mixture comprises metallic silicon and boron carbide.

6. The process of claim 2 wherein the reaction mixture is heated to 1400–1500° C.

7. The process of claim 2 wherein the reaction is carried out in the presence of an inert atmosphere.

8. The process of claim 2 wherein the proportions of the reaction mixture are selected so that more silicon is used than is present in the resulting alloy.

References Cited

UNITED STATES PATENTS

| 2,091,950 | 9/1937 | Andrieux | 75—122 |
| 2,124,538 | 7/1938 | Boyer | 75—134 |
| 3,246,950 | 4/1966 | Gruber | 75—134 |

RICHARD O. DEAN, *Primary Examiner.*

U.S. Cl. X.R.

148—32; 106—43; 75—135, 10